US008193434B2

(12) United States Patent
Ferguson

(10) Patent No.: US 8,193,434 B2
(45) Date of Patent: Jun. 5, 2012

(54) VERTICALLY ALIGNED DRUM SET

(76) Inventor: Cameron Troy Ferguson, Deerfield Beach, FL (US)

( * ) Notice: Subject to any disclaimer, the term of this patent is extended or adjusted under 35 U.S.C. 154(b) by 0 days.

(21) Appl. No.: 12/859,814

(22) Filed: Aug. 20, 2010

(65) Prior Publication Data

US 2011/0041670 A1 Feb. 24, 2011

Related U.S. Application Data

(60) Provisional application No. 61/274,727, filed on Aug. 21, 2009.

(51) Int. Cl.
*G01D 13/02* (2006.01)

(52) U.S. Cl. .................................................... 84/411 R

(58) Field of Classification Search ................. 84/411 R
See application file for complete search history.

(56) References Cited

U.S. PATENT DOCUMENTS

| | | | | |
|---|---|---|---|---|
| 7,074,995 | B2 | 7/2006 | Barakat | |
| 2008/0034945 | A1 | 2/2008 | Meinl | |
| 2008/0078279 | A1 | 4/2008 | Belli | |
| 2011/0113948 | A1 * | 5/2011 | Izen et al. | 84/411 R |

* cited by examiner

*Primary Examiner* — Kimberly Lockett
(74) *Attorney, Agent, or Firm* — Ziegler IP Law Group, LLC

(57) ABSTRACT

A drum assembly includes a first drum assembly positioned above a second drum assembly in a spaced apart relationship, where the bottom of the first drum assembly is positioned above the second drum assembly. Sound waves emanated from a playing surface of the first drum assembly impact a playing surface of the second drum assembly.

19 Claims, 4 Drawing Sheets

VERTICALLY ALIGNED DRUM SET

CROSS-REFERENCE TO RELATED APPLICATIONS

This application claims priority to and the benefit of U.S. Provisional Application No. 61/274,727 which was filed on Aug. 21, 2009, the disclosure of which is incorporated herein by reference in its entirety.

BACKGROUND OF THE INVENTION

The present disclosure generally relates to musical instruments, and more particularly to a lower drum assembly that can be played from an upper drum assembly.

The musical sounds that are produced by different types of instruments are varied and unique to each particular instrument. Drums are an example of an instrument that can produce varied tones and qualities of sound depending upon the shape, size and materials of the drum. Two separate instruments, when played in chorus, produce an overall musical sound and effect that is at once greater and different than each of the instruments when played individually. Often times, however, the combined sound of two instruments played simultaneously cannot be achieved, as they must each be played by a separate musicians. For example, having both a conga drum and a snare drum played simultaneously will produce a unique and desirable musical result.

The sounds of a conga drum are produced by beating on a playing surface with two hands, thus forcing air and sound waves through the hollow body of the instrument and out an opening in the bottom. Conga drums produce often rich, at times muted, tones. Alternately, a snare drum produces sharper, rattling tones. Generally, a snare drum is made of a cylinder with two opposing drum heads on each end. The top drum head, or batter head, is struck with wooden drum sticks to force air and sound waves downward through the hollow cylindrical body. The bottom drum head or playing surface includes snares or wires that are tightened against the underneath surface of this drum head. When the sound and air pushed from the batter head impact the snares and lower playing surface, the “snare” sounds that are typical to a snare drum are produced. Since the snare and conga produce sounds that are different but at times complementary, it is desirable to play both at once. However, an individual wishing to produce the combined sounds of these drums can do so only in a limited fashion, as it requires two hands to play each of the two instruments. It would be desirable to have a single drum apparatus that can be played by a single person that can produce the combined sounds of two distinct drums.

Accordingly, it would be desirable to provide a system that addresses at least some of the problems identified above.

BRIEF DESCRIPTION OF THE INVENTION

As described herein, the exemplary embodiments overcome one or more of the above or other disadvantages known in the art.

One aspect of the exemplary embodiments relates to a drum assembly including a first drum assembly having a body portion, the body portion having a top end and a bottom end, the top end comprising a playing surface; a second drum assembly having a body portion, the body portion having top end and a bottom end, the bottom end having a playing surface; the first drum assembly being positioned above the second drum assembly, wherein the bottom end of the first drum assembly is positioned in a spaced apart relationship above an end of the second drum assembly.

In another aspect, the exemplary embodiments relate to a musical instrument assembly including a first drum assembly having a body portion comprising a top playing surface and a bottom end, the bottom end including an opening; a second drum assembly comprising a body portion having a playing surface at one end and an opening at an other end; the first drum assembly and the second drum assembly being arranged in a vertical acoustical alignment, with the opening in the bottom end of the first drum assembly facing the open end of the second drum assembly, and wherein a sound wave generated by the playing surface of the first drum assembly is configured to impact upon the playing surface of the second drum assembly to produce an audible sound.

These and other aspects and advantages of the exemplary embodiments will become apparent from the following detailed description considered in conjunction with the accompanying drawings. It is to be understood, however, that the drawings are designed solely for purposes of illustration and not as a definition of the limits of the invention, for which reference should be made to the appended claims. Moreover, the drawings are not necessarily drawn to scale and unless otherwise indicated, they are merely intended to conceptually illustrate the structures and procedures described herein. In addition, any suitable size, shape or type of elements or materials could be used.

DETAILED DESCRIPTION OF THE EXEMPLARY EMBODIMENTS OF THE DISCLOSURE

Figure 1:
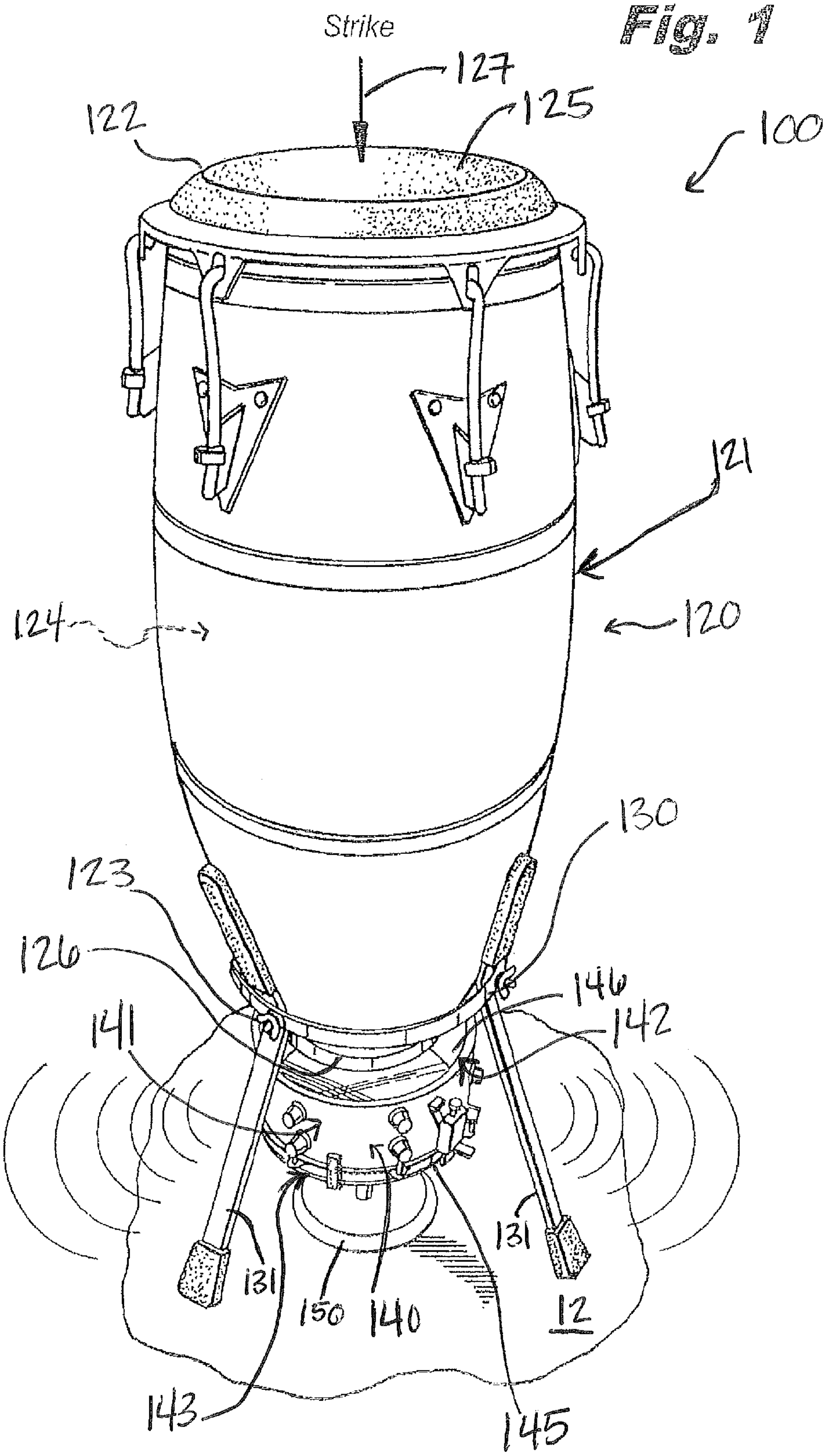
FIG. 1 is a perspective view of one embodiment of an exemplary musical instrument incorporating aspects of the present disclosure.

Referring to FIG. 1, an exemplary musical instrument incorporating aspects of the disclosed embodiments is generally designated by reference numeral 100. In this example the musical instrument 100 is shown as a drum set or assembly, with a first or upper drum assembly 120 positioned or aligned over or above a second or lower drum assembly 140. The aspects of the disclosed embodiments are generally directed to a drum assembly that allows a second or lower drum assembly 140 to be played using the sound waves that are generated and air that is pushed from playing the first or upper drum assembly 120. Although the aspects of the disclosed embodiments are generally described herein with respect to an upper and lower drum assembly, arranged in a substantially vertical orientation, the aspects of the disclosed embodiments are not so limited, and in alternate embodiments the drums could be arranged in a substantially horizontally orientation, or such other suitable end-to-end configuration.

As is illustrated in FIG. 1, the upper drum assembly 120 generally comprises a body portion 121 having a top portion 122 and a bottom portion 123. The body portion 121, including the top 122 and bottom 123 generally bound an internal sound chamber 124. The top portion 122 of the upper drum assembly 120 generally comprises a drum head 125 or other suitable drum playing surface, as is generally understood in the art. The playing of the first drum assembly 120 will generate sound waves or push air from the drum head 125 through the sound chamber 124 towards the bottom portion 123. Where the bottom 123 of the body portion 121 includes an opening 126, the sound waves generated by playing the playing surface or drum head 125 can travel through the body portion 121 and propagate out through the opening 126. In one embodiment, the opening 126 is a fully open, unobstructed circular hole in the bottom 123. In alternate embodiments, the opening 126 can be of any suitable size and shape that will allow sounds waves and pushed air to pass out of the sound chamber 124. In further embodiments, the opening 126 may additionally include either a full or partial barrier or membrane covering to allow only a portion of the sound or pushed air to emanate therefrom. In one embodiment, the membrane can be comprised of any material that is suitable for a playing surface of a drum. In alternate embodiments, the membrane may be made of any suitable material and may be smooth or perforated, or otherwise structured so as to block or in some way alter the sound or pushed air emanating from the internal sound chamber 124.

In one embodiment, the first drum assembly 120 comprises a standard conga drum, as that term is generally understood in the art. Generally, conga drums are approximately 25-35 inches tall, 40-60 inches in circumference, and 9-15 inches in diameter. In alternate embodiments, any suitably sized conga drum may be used. Additionally, the conga drum may be of any suitable material. It is understood that the size and material of the conga drum will alter the sound produced, but will not otherwise limit or alter the aspects of the disclosed embodiments.

The second or lower drum assembly 140 generally comprises a body portion 141 that includes a top portion or end 142 and a bottom portion or end 143. In this example, the top portion 142 generally comprises an opening 146, while the bottom portion 143 of the lower drum assembly generally comprises a drum head or playing surface 145. In one embodiment, the lower drum assembly 140 comprises a snare drum, as the term is understood in the art, with the batter head playing surface removed. The snare drum according to the present disclosure is not limited to any particular size or material of construction. Any suitable snare drum, as is understood in the art, may be used. Generally, a snare drum includes a second drum head or batter head on the top or upper portion 142 which, when struck by a wooden drumstick, generates the sound waves and pushed air necessary to produce a sound at playing surface 145. According to one embodiment, lower drum assembly 140 includes no such batter head, as the sound waves necessary for producing a sound from the lower drum assembly 140 are generated by striking drum head 127 of the upper drum assembly 120. Although a batter head is not necessary to the function of the present disclosure and is, thus, not described with regards to the aspects thereof, it is understood that the present disclosure is not so limited and any standard snare drum including a batter head may additionally be used. In one embodiment, drum head or playing surface 145 of lower drum assembly 140 comprises snares or wires (not pictured) which may be loosened or tightened against the drum head, as is typical to a snare drum and is understood in the art.

As is shown in FIG. 1, in one embodiment, the upper drum assembly 120 and lower drum assembly 140 are arranged vertically, with the upper drum assembly 120 being positioned or aligned substantially over the lower drum assembly 140. The bottom 123 of the upper drum assembly 120 is aligned over the top 142 of the lower drum assembly 140. In the example shown in FIG. 1, the opening 126 in the bottom 123 of the upper drum assembly 120 is generally aligned over the opening or open end 146 of the top 142 of the lower drum assembly 140. As the upper drum assembly 120 is played, by for example a strike 127 on the drumhead 125, the sound waves generated by the contact with the drum head or playing surface 125 travel out of the opening 126 at the bottom end 123, through the opening 146 and are imparted upon the drum head 145 of the lower drum assembly 140.

In one embodiment, the lower drum assembly 140 may be inverted so that the bottom 123 of the upper drum assembly 120 may be aligned over the bottom 143 of the lower drum assembly 140. In this arrangement, the open end 126 of the upper drum assembly will be aligned substantially over or in-line with the drum head or playing surface 145.

The position or alignment of the bottom end 123 of the upper drum assembly 120 with respect to playing surface 145 of the lower drum assembly 140 is generally referred to herein as a "sound communication position." In this alignment, the playing of the upper drum assembly 120 will generate sound waves that impact upon the playing surface 145 of the lower drum assembly 140, and cause the lower drum assembly 140 to generate appropriate sounds. The sound communication position is adjustable, meaning that the position and orientation of the drum head 145 of the lower drum assembly 140 can be adjusted or manipulated to vary the intensity and effect of the sound produced. For example, moving the drum head 145 closer to the open end or opening 126 of the upper drum assembly 120 can cause an increase or greater intensity in the sound produced, when the impacts 127 on the drum head 122 are substantially constant. Moving the drumhead 145 away from the open end or opening 126 can cause a decrease in the intensity. Moving the drum head 145 horizontally, or side to side, underneath the opening 126, so that more or less of a the drum head 145 is exposed to the bottom end 123, can result in sound variance, as more or less of the sound waves generated from the upper drum assembly 120 impacting on the drum head 145. The horizontal alignment can also result in different intensities, impressions and effects of the sound produced. In one embodiment, the lower drum assembly 140 can also be pivoted about an axis, in order to angle or pivot a plane of the drumhead 145 about the axis Y-Y, relative to the bottom end 123 of the upper drum 120. The different alignments, distances, positions and orientations the drumhead 145 relative to the opening 126 can be adjusted to produce different or desired sounds, effects and impressions.

In one embodiment, lower drum assembly 140 can be positioned approximately 0 to 10 inches away from the lower end 123 of upper drum assembly 120. In another embodiment, the lower drum assembly 140 may be positioned approximately 1 inch from the bottom end 123 of upper drum assembly 120. In alternate embodiments, any suitable distance may be measured between upper drum assembly 120 and lower drum assembly 140 including, but not limited to, having the lower drum assembly 140 situated inside the internal sound chamber 124 of upper drum assembly 120.

In one embodiment, referring to FIG. 1, the upper drum assembly 120 is supported by a stand 130. The stand 130 includes legs 131, which in this example number three. In alternate embodiments, the stand 130 can include any suitable number of legs 131, other than three, for supporting the upper drum assembly 120. In this example, the legs 131 are circumferentially spaced apart and suitably secured to the stand 130. The stand 130 is generally configured to support the upper drum assembly 120 in a substantially vertical orientation, with the bottom end 123 in a spaced apart relation from the floor 12.

As shown in FIG. 1, the lower drum assembly 140 can also be supported by a stand or base 150. In this example, the stand 150 is configured to support the lower drum assembly 140 in a spaced apart relation from both the floor 12 and the bottom end 123 of the upper drum assembly 120. In one embodiment, the stand 150 can be adjustable in each of the X, Y and Z axis, meaning the stand can move vertically, horizontally as well as rotate about the axis Y-Y.

Figure 2:
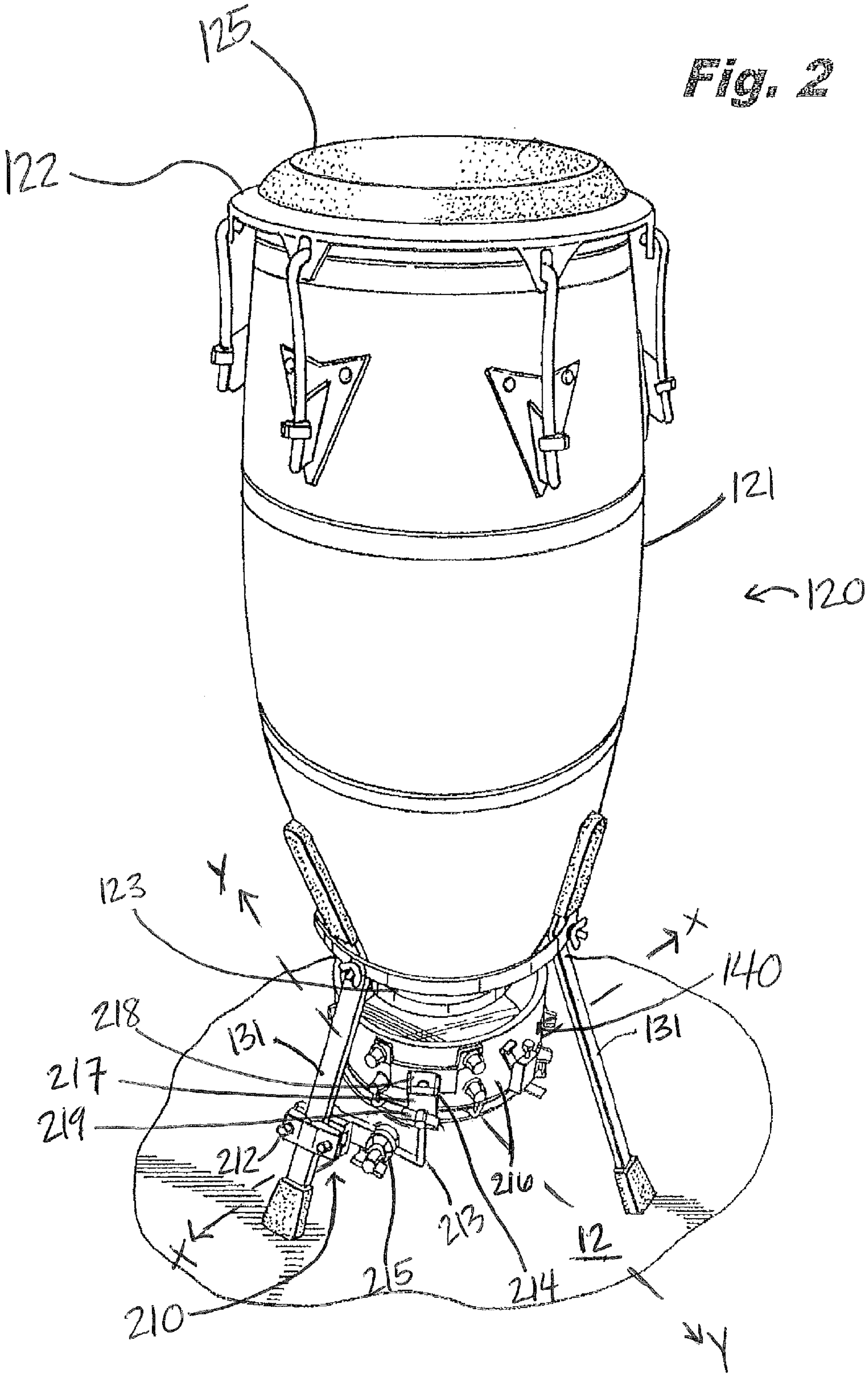
FIG. 2 is a perspective view of another embodiment of an exemplary musical instrument incorporating aspects of the present disclosure.

Referring to FIG. 2, in one embodiment, the lower drum assembly 140 can be supported in a spaced-apart relation between the floor 12 and the bottom 123 of the upper drum assembly 120 by a support assembly 210. In one embodiment, the support assembly 210 is coupled to a leg 131 of the stand 130 by a clamping member 212. A positional engagement member 214 is coupled to a side 216 of the lower drum assembly 140. As is shown in FIG. 2, an arm 213 is coupled to and between each of the bracket member 212 and the positional engagement member 214. In one embodiment, the arm 213 is substantially L-shaped.

In one embodiment, the clamping member 212 includes a rotatable attachment member 215 that is configured to receive one end of the arm 213. The rotatable attachment member 215 allows the lower drum assembly 140 to be tilted or angled relative to the bottom 123 of the upper drum assembly 120 about the X and Y axis.

The positional engagement member 214 shown in FIG. 2 generally comprises a channel member 218 that is secured to a side 216 of the lower drum assembly 140 and a bar member 217. The bar member 217 is generally configured to be slidingly received and engaged in the channel member 218. A screw device 219 is used to secure the bar member 217 in the channel member 218. The positional engagement member 214 is configured to allow the lower drum assembly 140 to be moved closer to or farther away from the bottom end 123 of the upper drum assembly 120, i.e. vertically, or up and down.

Figure 3:
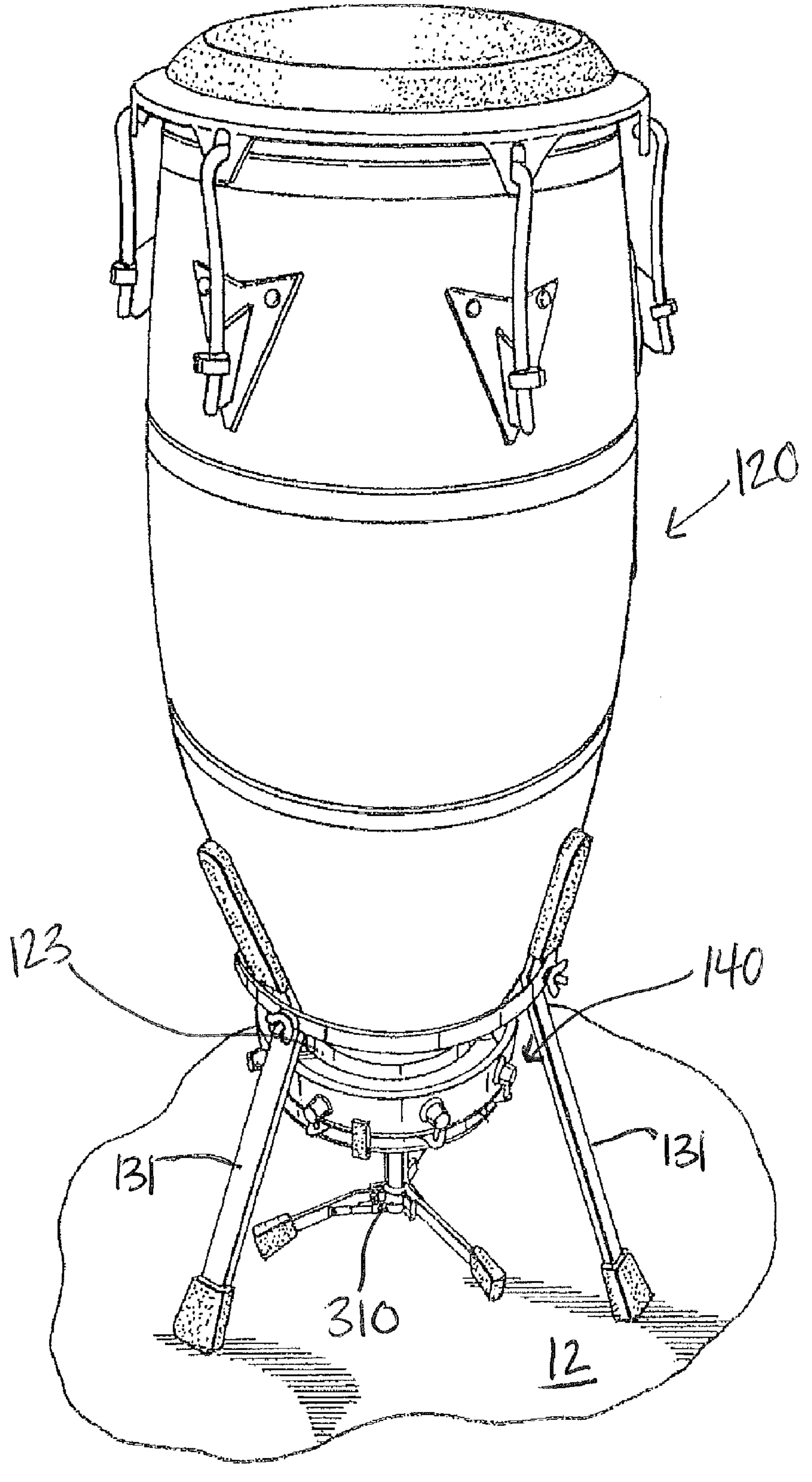
FIG. 3 is a perspective view of another embodiment of an exemplary musical instrument incorporating aspects of the present disclosure.

In the embodiment illustrated in FIG. 3, the lower drum assembly 140 is supported by a tripod style base 310. The tripod base 310 allows the lower drum assembly 140 to be moved up and down within the space between the floor 12 and the bottom end 123 of the upper drum assembly 120, so that it can be positioned closer or farther away from upper drum assembly 120. The function and operation of a tripod assembly for musical instruments, and in particular drums, is generally understood.

Figure 4:
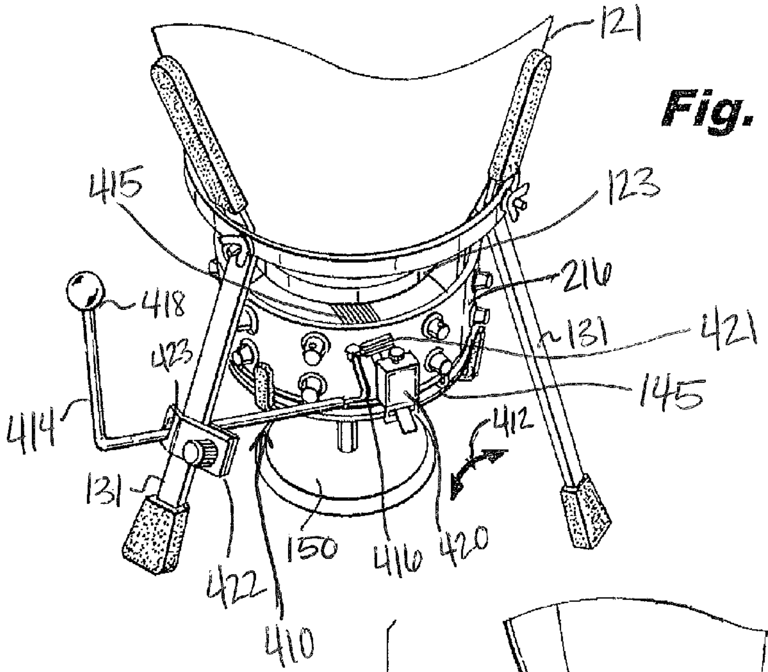
FIG. 4 is a perspective view of another embodiment of an exemplary musical instrument incorporating aspects of the present disclosure.

In the embodiment illustrated in FIG. 4, the lower drum assembly 140 includes a snare drum strainer portion 410. In one embodiment, strainer 410 is substantially similar to a typical strainer, as the term is understood in the art. The strainer 410 includes a strainer switch portion 420 attached to a side 216 of the lower drum assembly 140. Switch 420 is generally capable of being switched between an ON and OFF mode by the movement of a lever 421 along a direction designated by arrows 412. In the ON position, snares or wires 415 are tightened, engaged or brought into contact with playing surface 145. Thus, an impact on playing surface 145 produces the rattling sound of the snares or wires against the playing surface that is characteristic to snare drums. In the OFF position, snares or wires 415 are loosened, thus, when the playing surface is struck by pushed air or sound waves the characteristic sound of the snares is reduced or even removed. The loosening or tightening of the snares 415 creates a variance in the sound produced by the lower drum assembly 140. It is understood that strainer 410 may include any suitable switch portion 420 configured to adjust the tension of the snares, including a slidable switch, digital or electronic switch or dimmer type of switch, and is not limited to the above description. In a further embodiment, switch 420 can comprise a variable position switch with an ON mode, an OFF mode, and one or more intermediate modes or positions. The intermediate modes can alter the manner in which the sound waves impacting upon the playing surface 145 of the lower drum assembly 140.

In an alternate embodiment, strainer portion 410 and switch 420 may be coupled to a muting or damper device configured to altogether mute the lower drum assembly 140 when switched to an OFF position. According to one embodiment, in the ON mode, the sound waves or pushed air from the upper drum assembly 120 and impacting upon the playing surface 145 will cause the lower drum assembly 140 to generate audible sound or drum music. In the OFF mode, the ability of the lower drum assembly 140 to generate sound responsive to any impact on the playing surface 145 is muted. Thus, the switch 420 can allow the user to control the playing of the lower drum assembly 140, and in particular, when the sound waves generated by the upper drum assembly 120 will cause the lower drum assembly 140 to play. In one embodiment, the ON and OFF modes can be achieved by the use of a drum head sound control device that is generally configured to apply pressure to the playing surface 145 of the lower drum assembly when switch 420 is in an OFF mode.

According to one embodiment, an extension portion 414 is coupled to the switch portion 420. One end 416 of the extension 414 is coupled to the switch portion 420, while the other end of the arm comprises a handle member 418. The extension portion 414 is removably attached to a leg 131 by bracket member 422. The bracket member 422 includes an opening or hole 423 for receiving, or allowing the arm 414 to pass through the bracket member 422. In one embodiment, the handle member 418 is configured to me moved in a vertical direction with respect to the body 121 of the upper drum assembly 120. Alternately, handle member 418 may be configured to engage the switch 420 when moved in other direction. In one embodiment, handle portion 418 can further include a pedal attachment or otherwise be configured to be controlled by foot. It is understood that strainer assembly 410 can be of any suitable size or length and can include any shaped handle attachment 418 in order to effectively loosen or tighten snares 415.

Generally, a pedal style control, i.e. a switch that is controlled by a foot of the user, can be the most effective in a drum playing situation. The pedal style control could be a push button switch, where each activation or push cycles the switch to a new mode or state. The pedal style control could also comprise a spring controlled variable switch where the normal position of the switch 420 is normally OFF, and applying pressure to the pedal causes the switch 420 to gradually or variable change from the OFF to ON states.

Figure 5:
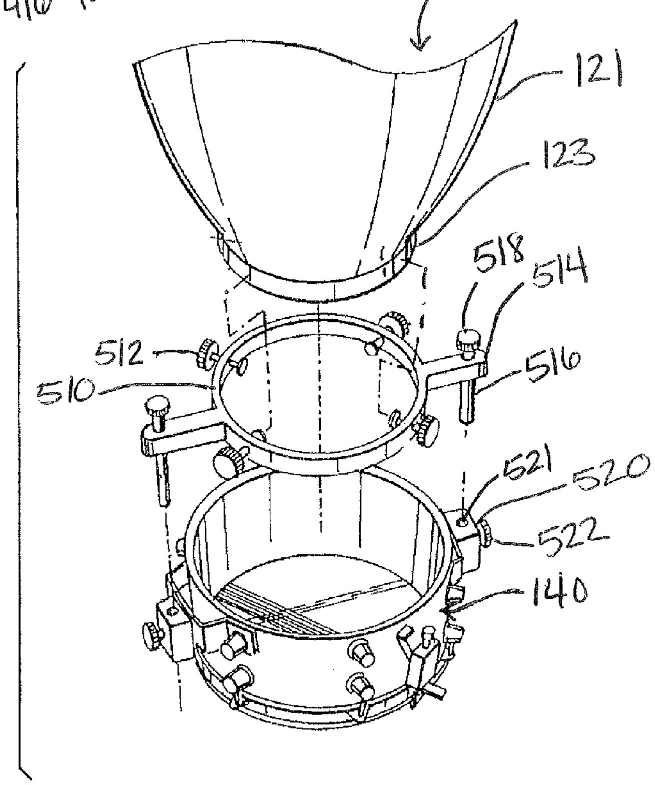
FIG. 5 is an expanded view of an embodiment of a support assembly according to the present disclosure.

Referring to FIG. 5, in one embodiment, a ring coupling member 510 is used to couple the bottom end 123 of the upper drum assembly 120 to the upper end 142 of the lower drum assembly 140 in order to support the lower drum assembly 140 in a spaced-apart relationship relative to the floor 12 and upper drum assembly 120. In this example, the ring member 510 is generally circular in configuration and has a diameter that is sufficient to allow the ring member 510 to be placed over the bottom end 123. One or more bolts or screws 512 can be used to secure the ring member 510 to the bottom end 123 of the upper drum assembly 120.

In one embodiment, one or more arm members or ears 514 extend outwardly from the side or outer circumference of the ring member 510. Each arm member 514 includes an opening or hole 516 that is configured to receive a bolt, screw or pin member 518. The screw member 518 is configured to be received in a corresponding bracket member 520 that includes a hole or opening 522. Once the member 516 is received in the hole 521 of the member 520, it can be secured in a desired position by screw or set screw member 522. The engagement of member 516 with the bracket 520 allows the lower drum assembly 140 to be supported in a spaced-apart relationship with upper drum assembly 120 and to be moved up and down relative to the bottom end 123 of the upper drum assembly 120.

The aspect of the disclosed embodiments generally provide a musical instrument that has two drums vertically oriented, with one drum positioned over the other drum. Playing the top drum will cause the bottom drum to be played. The lower drum can be oriented in a number of positions below the top drum in order to provide different musical or sound impressions. A switch can be used to control whether the bottom drum plays or not, as well as intensity with which the lower drum will play, responsive to the playing of the top drum.

Thus, while there have been shown, described and pointed out, fundamental novel features of the invention as applied to the exemplary embodiments thereof, it will be understood that various omissions and substitutions and changes in the form and details of devices illustrated, and in their operation, may be made by those skilled in the art without departing from the spirit of the invention. Moreover, it is expressly intended that all combinations of those elements and/or method steps, which perform substantially the same function in substantially the same way to achieve the same results, are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto

What is claimed is:

1. An apparatus comprising:

a first drum assembly having a body portion, the body portion having a top end and a bottom end, the top end comprising a playing surface;

a second drum assembly having a body portion, the body portion having top end and a bottom end, the bottom end comprising a playing surface;

the first drum assembly being positioned above the second drum assembly, wherein the bottom end of the first drum assembly is positioned in a spaced apart relationship above an end of the second drum assembly wherein the bottom end of the first drum assembly is positioned relative to the second drum assembly to allow a sound wave emanating from the playing surface of the first drum assembly to strike the playing surface of the second drum assembly.

2. The apparatus of claim 1 wherein the bottom end of the first drum assembly includes an opening.

3. The apparatus of claim 1 wherein the top end of the second drum assembly includes an opening.

4. The apparatus of claim 3 wherein the opening of the first drum assembly substantially faces the open top end of the second drum assembly.

5. The apparatus of claim 1 wherein the playing surface of the second drum assembly comprises a plurality of snares.

6. The apparatus of claim 5 further comprising a switch coupled to the second drum assembly, the switch being configured to control an operating mode of the second drum assembly, wherein when the switch is in an ON mode, the snares are engaged with the playing surface and when the switch is in an OFF mode, the snares are released.

7. The apparatus of claim 1 wherein the first drum assembly is a conga drum and the second drum assembly is a snare drum.

8. The apparatus of claim 1, wherein the second drum assembly is movable in a vertical direction relative to a position of the first drum assembly.

9. The apparatus of claim 1 wherein a plane of the second drum assembly can be angled relative to a plane of the bottom end of the first drum assembly.

10. The apparatus of claim 1 further comprising a switch coupled to the second drum assembly, the switch being configured to control an operating mode of the second drum assembly, wherein when the switch is in an ON mode, the playing surface of the second drum assembly generates an audible sound responsive to an impact of sound waves from the first drum assembly and when the switch is in an OFF mode, the playing surface of the second drum assembly is prevented from generating any audible sound responsive to the impact of sound waves from the first drum assembly.

11. The apparatus of claim 1 comprising a ring member releasably coupling the bottom end of the first drum assembly to the body portion of the second drum assembly.

12. The apparatus of claim 11 wherein the ring member comprises a pair of attachment members extending laterally outward from an outer edge of the ring member, each attachment member including a retention member configured to movably engage a corresponding receiver member on a side of the second drum assembly.

13. The apparatus of claim 1 further comprising legs supporting the first drum, a leg bracket coupled to one of the legs, and an arm movably and rotatably coupling the body portion of the second drum assembly to the bracket.

14. The apparatus of claim 13 further comprising a movable bracket coupled to the body portion of the second drum assembly, the movable bracket coupled to one end of the arm, an other end of the arm connected to the leg bracket, the movable bracket configured to allow the second drum assembly to be moved up and down in a vertical orientation relative to the bottom end of the first drum assembly.

15. A musical instrument assembly comprising:

a first drum assembly having a body portion comprising a top playing surface and a bottom end, the bottom end including an opening;

a second drum assembly comprising a body portion having a playing surface at one end and an opening at an other end;

the first drum assembly and the second drum assembly being arranged in a vertical acoustical alignment, with the opening in the bottom end of the first drum assembly facing the open end of the second drum assembly, and wherein a sound wave generated by the playing surface of the first drum assembly is configured to impact upon the playing surface of the second drum assembly to produce an audible sound.

16. The musical instrument of claim 15 wherein the bottom end of the first drum assembly and the second drum assembly are in a vertically adjustable spaced apart relationship.

17. The musical instrument of claim 15 further comprising a movable arm coupling the second drum assembly to the first drum assembly, the movable arm being configured to move the second drum assembly vertically and horizontally relative to a position of the bottom end of the first drum assembly and angle a plane of the second drum assembly relative to a plane of the bottom end of the first drum assembly.

18. The musical instrument of claim 15 further comprising a ring member movably coupling the bottom of the first drum assembly to an end of the second drum assembly.

19. The musical instrument of claim 15 wherein the first drum assembly is a conga drum assembly and the second drum assembly is a snare drum assembly.

* * * * *